(12) United States Patent
Hiraiwa et al.

(10) Patent No.: US 11,888,185 B2
(45) Date of Patent: Jan. 30, 2024

(54) FUEL CELL

(71) Applicant: Sumitomo Electric Industries, Ltd., Osaka (JP)

(72) Inventors: Chihiro Hiraiwa, Osaka (JP); Takahiro Higashino, Osaka (JP); Masatoshi Majima, Osaka (JP); Hiromasa Tawarayama, Osaka (JP); Mitsuyasu Ogawa, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 451 days.

(21) Appl. No.: 17/051,826

(22) PCT Filed: Apr. 25, 2019

(86) PCT No.: PCT/JP2019/017542
§ 371 (c)(1),
(2) Date: Oct. 30, 2020

(87) PCT Pub. No.: WO2019/212024
PCT Pub. Date: Nov. 7, 2019

(65) Prior Publication Data
US 2021/0057763 A1    Feb. 25, 2021

(30) Foreign Application Priority Data

May 1, 2018 (JP) ................. 2018-088377

(51) Int. Cl.
*H01M 8/0232* (2016.01)
*H01M 8/0245* (2016.01)
(Continued)

(52) U.S. Cl.
CPC ....... *H01M 8/0232* (2013.01); *H01M 8/0245* (2013.01); *H01M 8/0247* (2013.01);
(Continued)

(58) Field of Classification Search
CPC ............ H01M 8/0232; H01M 8/0245; H01M 2008/1293; H01M 8/0637; H01M 8/12
See application file for complete search history.

(56) References Cited

U.S. PATENT DOCUMENTS 6,465,133 B1 * 10/2002 Kariya ................. C25D 5/56
428/560
2004/0234836 A1   11/2004 Orishima et al.
(Continued)

FOREIGN PATENT DOCUMENTS

JP    2003-528980 A    9/2003
JP    2007-250297 A    9/2007
(Continued)

OTHER PUBLICATIONS

International Search Report and Written Opinion dated Jul. 9, 2019 for PCT/JP2019/017542 filed on Apr. 25, 2019, 9 pages including English Translation of the International Search Report.

*Primary Examiner* — Jeremiah R Smith
(74) *Attorney, Agent, or Firm* — XSENSUS LLP (57) ABSTRACT

A fuel cell includes a cell structure, an oxidizing agent flow path, a fuel flow path, and an anode-side current collector. The cell structure includes a cathode, an anode, and a solid electrolyte layer disposed between the cathode and the anode. The oxidizing agent flow path is formed adjacent to the cathode and away from the solid electrolyte layer. The oxidizing agent flow path is a flow path for supplying a gas that contains an oxidizing agent to the cathode. The fuel flow path is formed adjacent to the anode and away from the solid electrolyte layer. The fuel flow path is a flow path for supplying a fuel gas that contains water vapor and a hydrocarbon to the anode. The anode-side current collector is disposed adjacent to the anode and away from the solid electrolyte layer. The anode-side current collector is in contact with the anode.

5 Claims, 5 Drawing Sheets

(51) Int. Cl.
    *H01M 8/0637*     (2016.01)
    *H01M 8/12*     (2016.01)
    *H01M 8/0247*     (2016.01)

(52) U.S. Cl.
    CPC ........... *H01M 8/0637* (2013.01); *H01M 8/12* (2013.01); *H01M 2008/1293* (2013.01)

(56) References Cited

U.S. PATENT DOCUMENTS

| | | | |
|---|---|---|---|
| 2017/0025687 A1* | 1/2017 | Noda | H01M 8/0232 |
| 2017/0098841 A1 | 4/2017 | Higashino et al. | |
| 2017/0317371 A1* | 11/2017 | Higashino | H01M 8/126 |
| 2018/0205096 A1* | 7/2018 | Hiraiwa | H01M 8/1231 |
| 2019/0044159 A1 | 2/2019 | Miyamoto et al. | |

FOREIGN PATENT DOCUMENTS

| | | | | |
|---|---|---|---|---|
| JP | 2012-132083 A | 7/2012 | | |
| JP | 2017-33918 A | 2/2017 | | |
| WO | 01/72508 A1 | 10/2001 | | |
| WO | 03/012903 A1 | 2/2003 | | |
| WO | 2007/105072 A2 | 9/2007 | | |
| WO | 2015/151645 A1 | 10/2015 | | |
| WO | WO-2016076078 A1 * | 5/2016 | ......... | H01M 4/9033 |
| WO | 2017/010435 A1 | 1/2017 | | |

* cited by examiner

FUEL CELL

CROSS-REFERENCE TO RELATED APPLICATIONS

The present application is based on PCT filing PCT/JP2019/017542, filed Apr. 25, 2019, which claims priority to JP 2018-088377, filed May 1, 2018, the entire contents of each are incorporated herein by reference.

TECHNICAL FIELD

The present disclosure relates to a fuel cell.

BACKGROUND ART

In fuel cells, a membrane-electrode assembly (MEA) is used. To supply a fuel gas or air to the fuel cell, a gas flow path adjacent to the MEA is needed. For example, PTL 1 discloses that an expanded metal is disposed between an MEA and an interconnector to ensure a gas flow path. PTL 2 teaches a method for forming dimples in an interconnector by etching or the like. The dimples serve as a gas flow path.

CITATION LIST

Patent Literature

PTL 1: Japanese Examined Patent Application Publication No. 2007-250297
PTL 2: International Publication No. 2003/12903 pamphlet

SUMMARY OF INVENTION

An aspect of the present disclosure relates to a fuel cell that includes a cell structure, an oxidizing agent flow path, a fuel flow path, and an anode-side current collector. The cell structure includes a cathode, an anode, and a solid electrolyte layer disposed between the cathode and the anode. The oxidizing agent flow path is formed adjacent to the cathode and away from the solid electrolyte layer. The oxidizing agent flow path is a flow path for supplying a gas that contains an oxidizing agent to the cathode. The fuel flow path is formed adjacent to the anode and away from the solid electrolyte layer. The fuel flow path is a flow path for supplying a fuel gas that contains water vapor and a hydrocarbon to the anode. The anode-side current collector is disposed adjacent to the anode and away from the solid electrolyte layer. The anode-side current collector is in contact with the anode. The anode-side current collector is a porous metal body having a three-dimensional network structure in which a framework is integrally continuous. The framework includes an outer shell and a core portion. The core portion is hollow, includes a conductive material, or is hollow and includes a conductive material. At least an outer layer in the outer shell includes an alloy layer or a Cu-containing copper layer. The alloy layer contains a first metal and a second metal with the first metal being Ni.

DESCRIPTION OF EMBODIMENTS

Problems to be Solved by the Present Disclosure

The electrons flowing through a cell structure are collected via a metal material that is in contact with an anode and/or a cathode. If an amount of the metal material that is in contact with the anode and/or a cathode is small, electrons cannot easily flow, and, therefore, electrical resistance increases. In the method of PTL 1, the expanded metal, which is disposed to ensure a gas flow path, also plays a role as a current collector. Unfortunately, expanded metals have a large opening diameter, which tends to result in an increase in electrical resistance.

Accordingly, it is conceivable to dispose separate materials, namely, a material that mainly plays a role in collecting current and a material that mainly plays a role in diffusing gas. For example, a metal material (current collector) whose main role is to perform a current collection function may be disposed between the cell structure and an interconnector.

However, in a solid oxide fuel cell (hereinafter referred to as an SOFC) of the internal-reforming-type, carbon tends to be deposited on a current collector on the anode side, and, therefore, increasing the durability of the current collector to be provided on the anode side has been a challenge.

Advantageous Effects of the Present Disclosure

The present disclosure enables realization of a fuel cell having excellent durability and also having excellent current collection characteristics.

DESCRIPTION OF EMBODIMENTS OF THE PRESENT DISCLOSURE

First, the contents of embodiments of the present disclosure will be recited and described.

(1) According to an embodiment of the present disclosure, a fuel cell includes a cell structure, an oxidizing agent flow path, a fuel flow path, and an anode-side current collector. The cell structure includes a cathode, an anode, and a solid electrolyte layer disposed between the cathode and the anode. The oxidizing agent flow path is formed adjacent to the cathode and away from the solid electrolyte layer. The oxidizing agent flow path is a flow path for supplying a gas that contains an oxidizing agent to the cathode. The fuel flow path is formed adjacent to the anode and away from the solid electrolyte layer. The fuel flow path is a flow path for supplying a fuel gas that contains water vapor and a hydrocarbon to the anode. The anode-side current collector is disposed adjacent to the anode and away from the solid electrolyte layer. The anode-side current collector is in contact with the anode. The anode-side current collector is a porous metal body having a three-dimensional network structure in which a framework is integrally continuous. The framework includes an outer shell and a core portion. The core portion is hollow, includes a conductive material, or is hollow and includes a conductive material. At least an outer layer in the outer shell includes an alloy layer or a Cu-containing copper layer. The alloy layer contains a first metal and a second metal with the first metal being Ni.

A hydrogen gas is used as the fuel gas. Typically, hydrogen gases are produced by steam reforming of a hydrocarbon, such as propane. One method for steam reforming is external reforming, in which a reformer is disposed upstream of an SOFC, and the reforming reaction is carried out in the reformer. Another method for steam reforming that has been tried is internal reforming, in which a hydrocarbon gas is directly supplied to the anode, and steam reforming is carried out on the anode. In the former case, for the activity of a steam reforming catalyst, the reformer is heated to a high temperature of approximately 700° C. or higher by using an external heat source. Furthermore, since steam reforming reactions are endothermic reactions, it is preferable, in terms of thermal efficiency, to dispose the reformer close to an SOFC, and thus, internal reforming, in which reforming is carried out within the cell structure of an SOFC, is more preferable.

According to the above-described embodiment of the present disclosure, the porous metal body has a framework of a three-dimensional network structure, and, therefore, has high gas diffusibility and low electrical resistance. Hence, the porous metal body is suitable for use as a current collector of a fuel cell.

Porous metal bodies that are used as a current collector on the anode side include meshes or porous bodies of Ni metal; these are used because of their thermal resistance and low electrical resistance. However, Ni, in particular, is a high-activity steam reforming catalyst, and, therefore, the reforming reaction proceeds readily at a surface of the current collector. As a result, it is likely that carbon produced in the reforming reaction is deposited as soot on the surface of the current collector, and, consequently, durability is reduced.

In the case of an SOFC for which steam reforming is carried out within the cell structure, a mixed gas containing water vapor and a hydrocarbon is supplied to a fuel flow path on the anode side to carry out the steam reforming at the anode. In a case where the porous metal body has a catalytic effect with respect to a steam reforming reaction, the higher the ratio of the water vapor to the hydrocarbon gas in the mixed gas (the higher an S/C ratio), the more likely it is that the carbon present in the hydrocarbon gas is converted to carbon monoxide (CO) or carbon dioxide ($CO_2$) on the framework, and thus, the ratio of the conversion to carbon (C) is low, although this depends on the catalytic properties of the porous metal body. On the other hand, since the steam reforming reaction is an endothermic reaction, the higher the ratio of water vapor (the higher the S/C ratio), the larger the amount of power necessary for the heating for maintaining the temperature within the cell structure, and, therefore, the power generation efficiency is reduced.

Maintaining a high power generation efficiency in an SOFC for which internal reforming is carried out requires that the ratio of the water vapor to the hydrocarbon gas in the mixed gas be reduced to a specific value or less (the S/C ratio be reduced), and, in such a case, carbon (C) is easily produced on the framework in the steam reforming reaction of the hydrocarbon gas. Carbon (C) exists in a solid state even at the operating temperature of an SOFC, and, therefore, it is likely that the carbon is deposited on the framework, and, consequently, durability is reduced.

In particular, in a case where a porous metal body having a framework of a three-dimensional network structure is used, the reforming reaction proceeds readily on the framework because of the high specific surface area, and, consequently, it is likely that durability is reduced.

In contrast, with the embodiment described above, even in a fuel cell in which a porous metal body having a high specific surface area is used in a current collector, a catalytic reaction at a surface of the current collector is inhibited; this is because at least an outer layer in the outer shell of the framework includes an alloy layer or a Cu-containing copper layer, the alloy layer containing a first metal and a second metal with the first metal being Ni. As a result, a fuel cell having high durability is realized.

In a case where a porous metal body is used in a current collector on the anode side, the properties required in the metal material that forms the porous metal body include (i) high thermal resistance, (ii) high electrical conductivity, and (iii) no exhibition of a catalytic effect in steam reforming reactions. Ni is satisfactory in terms of (i) and (ii) but unsatisfactory in terms of (iii). However, when Ni forms an alloy with a second metal, Ni can be satisfactory in terms of (iii) while remaining satisfactory in terms of (i) and (ii). On the other hand, Cu is satisfactory in terms of all of (i) to (iii).

It is sufficient that the alloy layer or the copper layer be formed in at least an outer layer in the outer shell of the framework, but it is more preferable that the entirety of the outer shell be formed of the alloy layer or the copper layer.

(2) Preferably, an alloy layer containing Ni and a second metal is included in at least an outer layer in the outer shell of the framework, and the second metal contains Sn.

Sn easily forms an alloy with a first metal such as Ni. With an alloy of Ni and Sn, catalytic activity with respect to steam reforming reactions can be reduced while maintaining a high thermal resistance. The alloy layer containing Ni and Sn may be formed by plating a Ni-containing outer shell of a framework with Sn or an alloy of Ni and Sn.

For example, a surface of a Ni-containing outer shell of a framework may be coated with Sn or an alloy of Ni and Sn by using a method such as a plating process, and subsequently, the resultant may be heat-treated in a reducing atmosphere; accordingly, Sn diffuses into the interior of the Ni-containing outer shell, and, consequently, a region extending from the outer layer of the outer shell to a certain depth is changed into an alloy layer containing Ni and Sn (hereinafter referred to as a "Ni—Sn layer", where appropriate). The Ni—Sn layer exhibits high thermal resistance even in a high-temperature range of 800° C. to 1000° C. and exhibits little catalytic activity in steam reforming reactions.

(3) Preferably, a first phase and a second phase that have different respective Sn concentrations with respect to Ni may coexist in the alloy layer. Here, the Sn concentration of the first phase is assumed to be greater than the Sn concentration of the second phase.

(4) In the Ni—Sn layer, the first phase, which has a high Sn concentration with respect to Ni, and the second phase, which has a lower Sn concentration with respect to Ni than does the first phase, coexist. It is believed that in the first phase, Ni and Sn exist in the form of an intermetallic compound (e.g., $Ni_3Sn$). It is believed that the second phase is a phase containing Ni as a major component, and Sn and Ni are present therein in a form in which Sn is dissolved in Ni. Of the first and second phases described above, the first phase, which is an intermetallic compound, has lower catalytic activity than does the second phase. Accordingly, the higher the ratio of the first phase to a total of the first phase and the second phase in the Ni—Sn layer, the lower the catalytic activity exhibited by the alloy layer toward steam reforming reactions. On the other hand, however, thermal resistance decreases, and electrical conductivity decreases.

Regarding the compositional ratio between Ni and Sn in the Ni—Sn layer, it is sufficient that a ratio of Sn in the Ni—Sn layer be greater than or equal to 4 mass % relative to a total amount of Ni and Sn in the Ni—Sn layer taken as 100 mass %, from the standpoint of ensuring catalytic inactivity toward steam reforming reactions. The ratio of Sn is preferably greater than or equal to 5 mass % and more preferably greater than or equal to 6 mass %. On the other hand, from the standpoint of maintaining a high thermal resistance and electrical conductivity, it is sufficient that the ratio of Sn in the Ni—Sn layer be less than or equal to 15 mass % relative to the total amount of Ni and Sn in the Ni—Sn layer taken as 100 mass %. The ratio of Sn is preferably less than or equal to 13 mass % and more preferably less than or equal to 11 mass %. When Sn is present in the Ni—Sn layer in a compositional ratio that satisfies such conditions, two phases are observed in the Ni—Sn layer: an intermetallic compound phase (first phase) that contains $Ni_3Sn$ as a major component and a phase (second phase) that contains Ni as a major component with Sn being dissolved in Ni. Because of the coexistence of the first phase and the second phase, catalytic activity toward steam reforming reactions is inhibited, and thermal resistance and good electrical conductivity are ensured.

(5) Preferably, the porous metal body has a porosity of 90% or greater and 98% or less. When the porous metal body has a porosity within such a range, the porous metal body has high gas diffusibility and low electrical resistance. Hence, the porous metal body is suitable for use as a current collector on the anode side of an internal-reforming-type SOFC. It should be noted that since the porous metal body has a very high specific surface area, in a case where the metal used has a catalytic effect with respect to steam reforming reactions, a steam reforming reaction proceeds readily at a surface of the framework, and it is likely that carbon is deposited on the surface of the framework.

As described above, however, at least an outer layer in the outer shell of the framework is formed of a layer of a metal that does not have a catalytic effect, and as a result, a steam reforming reaction at the surface of the framework is inhibited, and, therefore, deposition of carbon is inhibited. Consequently, the durability of a current collector is enhanced, and as a result, the durability of a fuel cell as a whole is enhanced.

Note that the porosity of the porous metal body is defined by the following equation.

Porosity (%)=[1−{$Mp/(Vp \times dp)$}]×100

Mp: a mass (g) of the porous metal body
Vp: a volume ($cm^3$) of the apparent shape of the porous metal body
dp: a density ($g/cm^3$) of the metal that forms the porous metal body The true density dp of the porous metal body is measured by using, for example, an Accupyc 1330, manufactured by Shimadzu Corporation.

DETAILS OF EMBODIMENTS OF INVENTION

Specific examples of embodiments of the present invention will be described below with reference to the drawings where appropriate. Note that the present invention is not limited to the examples and is defined by the appended claims, and all changes that fall within the meaning and scope equivalent to those of the claims are intended to be embraced therein.

(Porous Metal Body)

Figure 1:
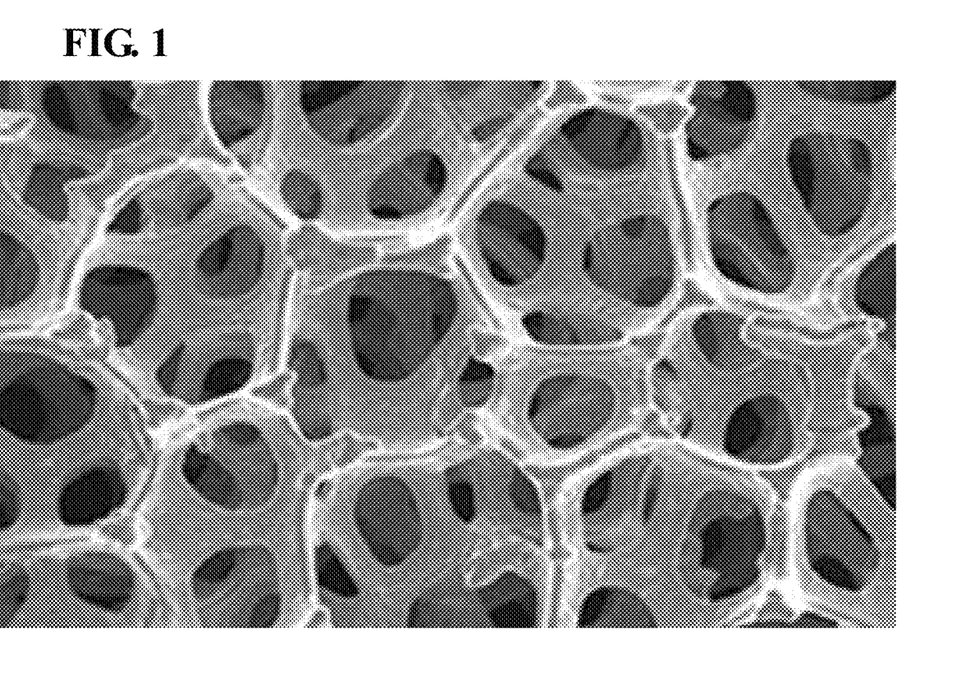
FIG. 1 is an enlarged photograph showing, in enlargement, an appearance of a porous metal body according to an aspect of the present disclosure.

As illustrated in FIG. 1, the porous metal body according to an embodiment is a porous metal body having a structure in the form of a three-dimensional network in which a framework is integrally continuous. As will be described later, the framework includes an outer shell and a core portion, and the core portion is hollow, includes a conductive material, or is hollow and includes a conductive material. At least an outer layer in the outer shell, which forms the framework, includes an alloy layer or a Cu-containing copper layer. The alloy layer contains a first metal and a second metal with the first metal being Ni.

(Framework)

Figure 2:
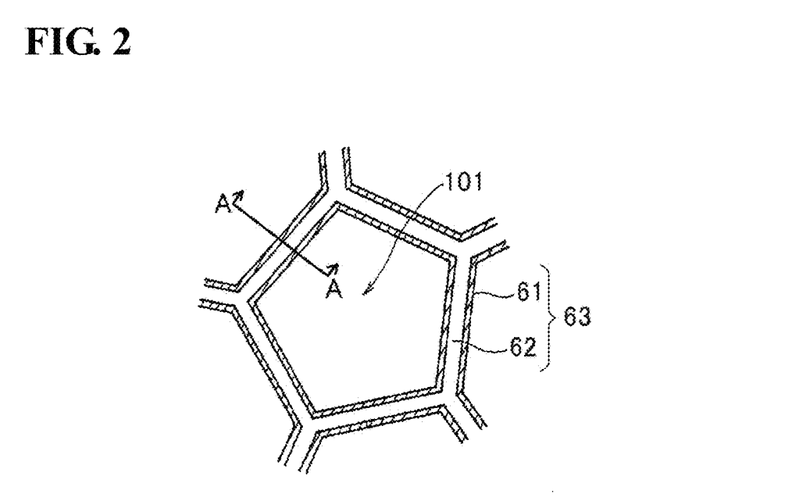
FIG. 2 is a schematic sectional view of a section of a portion of a framework shown in FIG. 1.
Figure 3A:
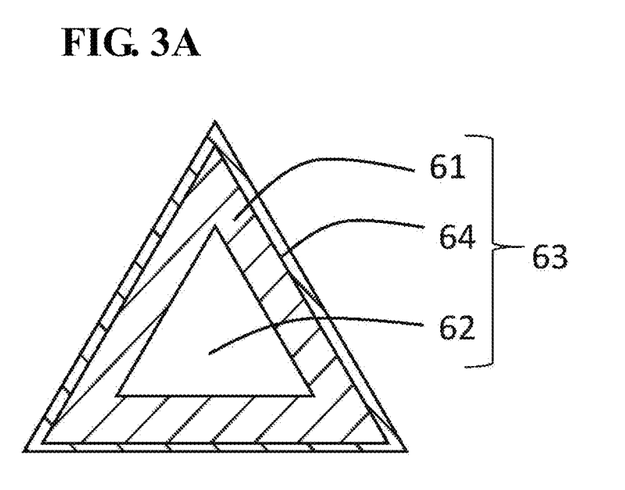
FIG. 3A is a sectional view taken along line A-A of FIG. 2.

As illustrated in FIG. 2 and FIG. 3A, the porous metal body has a structure in the form of a three-dimensional network, the structure including a framework 63 and pore portions 101. The framework 63 is formed of an outer shell 61 and a core portion 62. At least an outer layer in the outer shell 61 includes an alloy layer or a Cu-containing copper layer. The alloy layer contains a first metal and a second metal with the first metal being Ni. The core portion 62 is surrounded by the outer shell 61. The core portion 62 is hollow, includes a conductive material, or is hollow and includes a conductive material. The framework 63 forms a fiber portion, which will be described later. In the framework 63, the core portion 62, which is surrounded by the outer shell 61, may be hollow; in this case, the porous metal body is very lightweight. It should be noted that the framework may not be hollow, that is, the framework may be solid. In this case, the porous metal body has improved strength.

Furthermore, as illustrated in FIG. 3A, it is preferable that a cross section of the framework 63 orthogonal to a longitudinal direction thereof have a triangular shape. However, the cross-sectional shape of the framework 63 should not be limited thereto. The cross-sectional shape of the framework 63 may be a polygonal shape other than a triangular shape, such as a quadrilateral shape or a hexagonal shape. The cross-sectional shape of the framework 63 may be a circular shape.

The framework of the three-dimensional network structure is, for example, a framework similar to that of a structure in the form of a nonwoven fabric or a sponge, and a plurality of the pore portions 101 (minute openings), which are defined by the framework, are present. In the porous metal body, the metallic framework and minute openings surrounded by the framework form one cell portion.

Figure 3B:
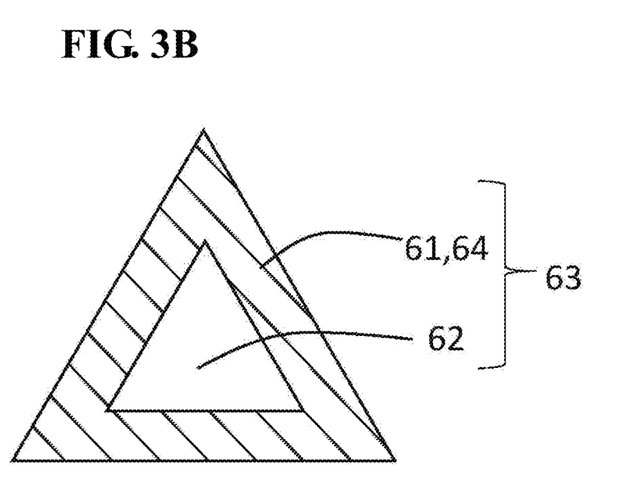
FIG. 3B is another sectional view taken along line A-A of FIG. 2.

In FIG. 3A, an alloy layer or copper layer 64 is formed in an outer layer in the outer shell of the framework. On the other hand, in FIG. 3B, the entirety of the outer shell is formed of the alloy layer or copper layer 64; this configuration is more preferable from the standpoint of durability and current collection characteristics.

Figure 4:
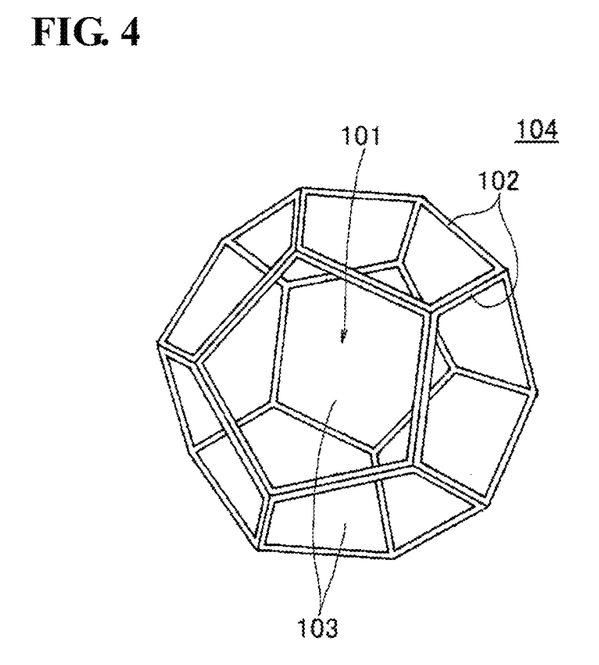
FIG. 4 is a schematic diagram illustrating an exemplary structure of a portion of a framework of a porous metal body.

As illustrated in FIG. 4, one cell portion 104 can be represented as a regular dodecahedron model, for example.

The pore portions 101 (minute openings) are defined by fibrous or rod-shaped metal portions (fiber portions 102). A plurality of the pore portions 101 are continuously disposed three-dimensionally. The framework of the cell portion 104 is formed by the connection of the fiber portions 102 to one another. In the cell portion 104, a generally pentagonal opening (or window) 103, which is surrounded by the fiber portions 102, is formed. Adjacent cell portions are in communication with each other with one opening 103 being shared. That is, the framework of the porous metal body is formed of the fiber portions 102, which define the plurality of continuous pore portions 101 and form an integrally continuous network in the form of a mesh. A framework having such a structure is referred to as a framework in the form of a three-dimensional network.

The porous metal body can be formed, for example, by coating a resin porous body having communicating openings with a metal. When the resin inside is removed after the metal coating process, a cavity is formed within the framework of the porous metal body, and thus, the framework becomes hollow. Commercially available porous metal bodies having such a structure include Celmet® made of nickel, manufactured by Sumitomo Electric Industries, Ltd.

The coating of a resin porous body with a metal can be accomplished, for example, by using a plating process or a vapor-phase process (vapor deposition, plasma-enhanced chemical vapor deposition, sputtering, or the like) or by, for instance, applying a metal paste.

With the coating process using a metal, the framework in the form of a three-dimensional network is formed. In particular, a plating process is preferable for the coating with a metal.

The plating process may be any plating process that can form a metal layer on surfaces (including surfaces of the internal cavities) of a resin porous body, and a known plating process may be employed, examples of which include electrolytic plating methods and molten salt plating methods. With a plating process, a porous metal body in the form of a three-dimensional network in conformance with a shape of the resin porous body is formed. That is, a pore diameter of the resulting porous metal body can be controlled by a pore diameter of the resin porous body.

The forming of the alloy layer containing Ni and a second metal in at least an outer layer in the outer shell of the framework can be accomplished in the following manner: a porous metal body including a Ni-containing outer shell of a framework is produced, and thereafter, a surface of the outer shell is coated with the second metal. Alternatively, a porous metal body including an outer shell made of an underlying metal may be produced, and thereafter, a surface of the outer shell may be coated with an alloy of Ni and the second metal. It is preferable that the second metal be Sn.

The forming of the Cu-containing layer in at least an outer layer in the outer shell can be accomplished in the following manner: a porous metal body including a Cu-containing outer shell of a framework is produced. Alternatively, a porous metal body including an outer shell made of an underlying metal may be produced, and thereafter, a surface of the outer shell may be coated with Cu to form the Cu-containing layer.

A preferred method for coating a surface of the outer shell is a plating method. Other methods that may be used include vapor-phase processes, such as plasma-enhanced chemical vapor deposition, sputtering, and atomic layer deposition processes.

In the case where a porous metal body having a framework that includes a Ni-containing outer shell is produced, and thereafter, a surface of the outer shell is coated with Sn, a heat treatment is to be subsequently performed in a reducing atmosphere at 800 to 1000° C. to diffuse Sn into the Ni-containing outer shell. As a result, a Ni—Sn alloy layer is formed in at least an outer layer in the Ni-containing outer shell.

In a case where the alloy layer containing Ni and Sn is formed by plating, an electrolytic plating bath containing stannous chloride, nickel chloride, and potassium pyrophosphate may be used, for example.

In a case where the Sn layer is formed by plating, an electrolytic plating bath containing sulfuric acid and stannous sulfate may be used, for example.

In a case where the Cu layer is formed by plating, an electrolytic plating bath containing copper sulfate, copper cyanide, or copper pyrophosphate may be used, for example.

The electroplating process may be carried out in accordance with a common method.

In solid oxide fuel cells for which steam reforming is carried out in the anode, the porous metal body described above can be preferably used as a current collector that is provided in contact with the anode.

(Configuration of Fuel Cell)

Figure 5:
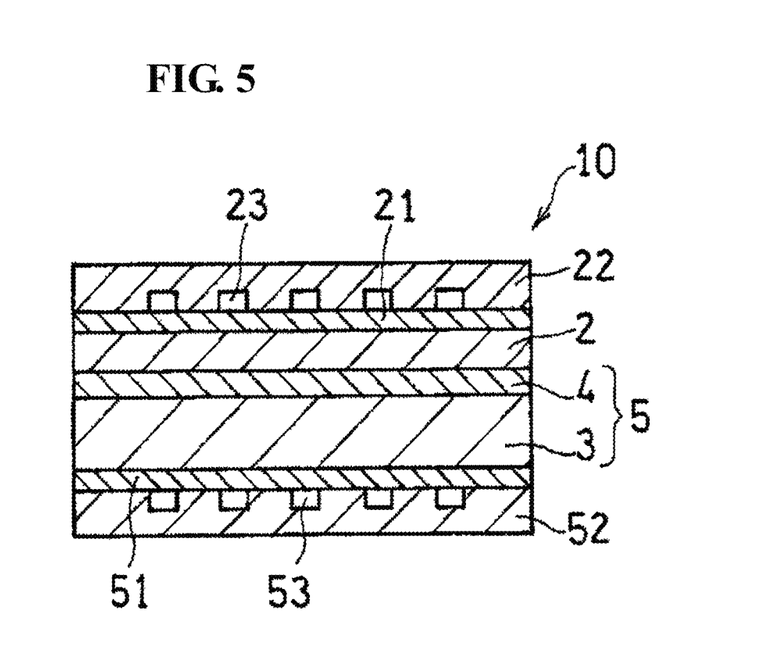
FIG. 5 is a schematic sectional view of a fuel cell according to an embodiment of the present disclosure.

FIG. 5 schematically illustrates a sectional structure of a fuel cell (solid oxide fuel cell) of an embodiment.

Figure 6:
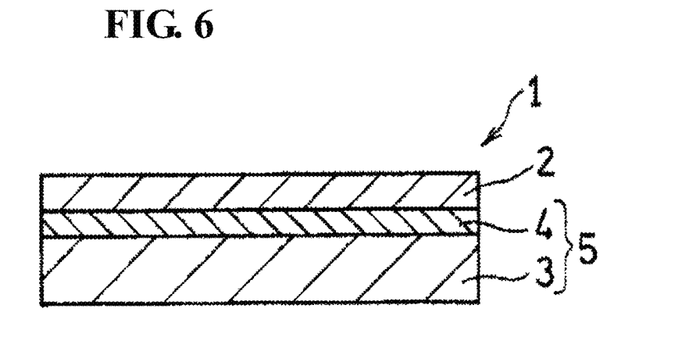
FIG. 6 is a schematic sectional view of a cell structure included in the fuel cell of FIG. 5.

A fuel cell 10 includes a cell structure 1. FIG. 6 schematically illustrates an exemplary sectional structure of the cell structure. As illustrated in FIG. 6, the cell structure 1 includes a cathode 2, an anode 3, and a solid electrolyte layer 4, which is disposed therebetween. Note that in the illustrated example, the anode 3 and the solid electrolyte layer 4 are integrated and form an electrolyte layer-electrode assembly 5.

As illustrated in FIG. 5, the fuel cell 10 includes an oxidizing agent flow path 23 and a fuel flow path 53, in addition to the cell structure 1. The oxidizing agent flow path 23 is a flow path for supplying a gas that contains an oxidizing agent to the cathode. The fuel flow path 53 is a flow path for supplying a fuel gas to the anode. In the example illustrated in FIG. 5, the oxidizing agent flow path 23 is formed by a cathode-side separator 22, and the fuel flow path 53 is formed by an anode-side separator 52. The cell structure 1 is sandwiched between the cathode-side separator 22 and the anode-side separator 52. The oxidizing agent flow path 23 in the cathode-side separator 22 is disposed to face the cathode 2 of the cell structure 1, and the fuel flow path 53 in the anode-side separator 52 is disposed to face the anode 3.

Each of the constituent elements of the fuel cell will be further described below.

(Solid Electrolyte Layer)

The solid electrolyte layer is a solid electrolyte layer that has proton conductivity or oxygen ion conductivity in a predetermined temperature range. A known material may be used for the solid electrolyte layer. Examples of metal oxides that have oxygen ion conductivity include yttria-stabilized zirconia (YSZ). In this case, SOFCs in which YSZ is used as the electrolyte need to be operated at a high temperature of 750° C. to 1000° C.

Furthermore, examples of metal oxides that have proton conductivity include perovskite oxides, such as $BaCe_{0.8}Y_{0.2}O_{2.9}$ (BCY) and $BaZr_{0.8}Y_{0.2}O_{2.9}$ (BZY). BCY and BZY exhibit a high proton conductivity in an intermediate temperature range of 400° C. to 600° C. and, therefore, can be used as a solid electrolyte layer of an intermediate-temperature fuel cell.

These metal oxides can be formed by sintering, for example, and can be used as a solid electrolyte layer.

In a case where the solid electrolyte layer has proton conductivity, the solid electrolyte layer 4 transports protons generated at the anode 3 to the cathode 2. In a case where the solid electrolyte layer has oxygen ion conductivity, the solid electrolyte layer 4 transports oxide ions generated at the cathode 2 to the anode 3.

A thickness of the solid electrolyte layer is, for example, 1 μm to 50 μm and preferably 3 μm to 20 μm. When the thickness of the solid electrolyte layer is within such a range, the solid electrolyte layer has a reduced resistance, and, therefore, such a thickness is preferable.

The solid electrolyte layer, together with the cathode and the anode, forms the cell structure, which can be incorporated into a fuel cell. In the cell structure, the solid electrolyte layer is sandwiched between the cathode and the anode. One of the major surfaces of the solid electrolyte layer is in contact with the anode, and the other of the major surfaces is in contact with the cathode.

(Cathode)

The cathode has a porous structure. In a case where a proton-conductive solid electrolyte layer is used, a reaction (oxygen reduction reaction) proceeds at the cathode between protons conducted through the solid electrolyte layer and oxide ions. The oxide ions are generated when an oxidizing agent (oxygen) introduced through the oxidizing agent flow path is dissociated.

A known material may be used as a material for the cathode. For example, the material for the cathode is preferably a compound containing lanthanum and having a perovskite structure (e.g., ferrite, manganite, and/or cobaltite), and, of these compounds, a compound further containing strontium is more preferable. Specific examples thereof include lanthanum strontium cobalt ferrite (LSCF, $La_{1-x1}Sr_{x1}Fe_{1-y1}Co_{y1}O_{3-\delta1}$, $0<x1<1$, $0<y1<1$, $\delta1$ is an oxygen deficiency), lanthanum strontium manganite (LSM, $La_{1-x2}Sr_{x2}MnO_{3-\delta1}$, $0<x2<1$, $\delta1$ is an oxygen deficiency), and lanthanum strontium cobaltite (LSC, $La_{1-x3}Sr_{x3}CoO_{3-\delta1}$, $0<x3<1$, $\delta1$ is an oxygen deficiency). To promote the reaction between protons and oxide ions, a catalyst such as Pt may be included in the cathode. In the case where a catalyst is to be included, the cathode can be formed by mixing the catalyst with any of the materials mentioned above and sintering the mixture.

The cathode can be formed, for example, by sintering the raw material of any of the materials mentioned above.

If necessary, a binder, an additive, and/or a dispersion medium, for instance, may be used together with the raw material.

A thickness of the cathode is not particularly limited and may be appropriately selected from thicknesses of, for example, 5 μm to 2 mm; or the thickness may be approximately 5 μm to 40 μm.

(Anode)

The anode has a porous structure. At the anode, a reaction (fuel oxidation reaction) proceeds in which a fuel gas introduced through the fuel flow path is oxidized to release protons and electrons.

In this embodiment, a mixed gas containing water vapor and a hydrocarbon is supplied as a fuel gas to the fuel flow path, and the hydrocarbon gas is reformed and converted into a hydrogen gas in the anode. The anode includes a catalyst for promoting the steam reforming.

A material for the anode may be, for instance, a composite oxide containing nickel oxide (NiO), which is a catalyst component, and YSZ or Gd-doped ceria (GDC) ($Ce_{1-x}Gd_xO_{2-y}$). $CeO_2$, BZY, or BCY, for instance, may be added to inhibit carbon deposition.

The anode can be formed by mixing the catalyst with any of the materials mentioned above and sintering the mixture.

A thickness of the anode may be appropriately selected from thicknesses of, for example, 10 μm to 2 mm; or the thickness may be 10 μm to 100 μm.

In FIG. 5 and FIG. 6, the thickness of the anode 3 is greater than that of the cathode 2, and thus, the anode 3 serves as a support that supports the solid electrolyte layer 4 (and, therefore, supports the cell structure 1).

Note that the thickness of the anode 3 may not necessarily be greater than that of the cathode 2, and, for example, the thickness of the anode 3 may be approximately equal to the thickness of the cathode 2.

Note that in the illustrated example, the anode is integrated with the solid electrolyte layer; however, this example is not limiting, and the cathode may be integrated with the solid electrolyte layer to form an electrolyte layer-electrode assembly.

The oxidizing agent flow path 23 includes an oxidizing agent inlet, through which a gas containing an oxidizing agent flows in, and an oxidizing agent outlet, through which water generated in the reaction, an unconsumed portion of the oxidizing agent, and the like are discharged (neither is illustrated). Examples of the oxidizing agent include oxygen-containing gases. The fuel flow path 53 includes a fuel gas inlet, through which a fuel gas containing water vapor and a hydrocarbon gas flows in, and a fuel gas outlet, through which an unconsumed portion of the fuel and reaction products such as $H_2O$, $N_2$, and $CO_2$ are discharged (neither is illustrated).

The fuel cell 10 includes an anode-side current collector 51, which is disposed between the anode 3 and the anode-side separator 52 and is in contact with the anode 3. Furthermore, the fuel cell may include a cathode-side current collector 21, which may be disposed between the cathode 2 and the cathode-side separator 22 and may be in contact with the cathode 2. The cathode-side current collector 21 performs a current collection function and, in addition, performs a function of diffusing and supplying, into the cathode 2, the oxidizing agent gas introduced through the oxidizing agent flow path 23. The anode-side current collector 51 performs a current collection function and, in addition, performs a function of diffusing and supplying, into the anode 3, the fuel gas introduced through the fuel flow path 53. That is, the cathode-side current collector 21 forms at least a portion of the oxidizing agent flow path 23, and the anode-side current collector 51 forms at least a portion of the fuel flow path 53. Accordingly, it is preferable that each of the current collectors be a structure that has sufficient gas permeability.

In a case where the fuel cell 10 includes a proton-conductive solid electrolyte, the fuel cell 10 can be operated in an intermediate temperature range of lower than 700° C., preferably approximately 400° C. to 600° C.

(Separator)

In a case where a fuel cell is formed by stacking a plurality of cell structures, the cell structure 1, the cathode-side separator 22, and the anode-side separator 52 may constitute a single unit, and such units may be stacked, for example. A plurality of the cell structures 1 may be, for example, connected to one another in series via separators that include gas flow paths (oxidizing agent flow path and fuel flow path) in both surfaces.

A material of the separator may be a heat resistant alloy, such as stainless steel, a nickel-based alloy, or a chromium-based alloy; these are cited in terms of proton conductivity and thermal resistance. In particular, stainless steel is inexpensive and therefore preferable. In protonic ceramic fuel cells (PCFCs), the operating temperature is approximately 400° C. to 600° C., and, therefore, stainless steel can be used as a material for the separator.

(Current Collector)

As the anode-side current collector, the porous metal body having a framework of a three-dimensional network structure, which is described above, is used. The three-dimensional network structure is a structure in which rod-shaped or fibrous metal pieces that form the porous metal body are three-dimensionally connected to one another and form an integrally continuous network. Examples thereof include structures in the form of a sponge and structures in the form of a nonwoven fabric. Such porous metal bodies are lightweight and have excellent gas permeability and, therefore, can be preferably used as a current collector of a fuel cell.

However, in a case where an internal-reforming-type fuel cell is formed by using, in the anode-side current collector, the above-described porous metal body having a three-dimensional network structure, there is a possibility that durability may be degraded if the steam reforming reaction proceeds at the surface of the metal framework of the porous metal body, and as a result, carbon is deposited on the surface of the anode-side current collector. Accordingly, for the framework of the porous metal body, a metal material that does not produce a catalytic effect is to be used, or the surface of the framework is to be treated such that a catalytic effect is not produced. In this regard, in a case where a porous Ni metal body is used in the anode-side current collector, it is preferable to perform a process of forming a Ni—Sn layer in at least a surface of the outer shell of the framework. For example, a Ni-containing outer shell may be coated with a Sn-containing layer, and thereafter, the resultant may be heat-treated to cause Sn to diffuse into the Ni-containing outer shell; accordingly, a Ni—Sn layer is formed.

On the other hand, the problem that arises on the anode side does not occur on the cathode side. Accordingly, as a structure to be used in the cathode-side current collector, it is possible to use a porous metal body in which the framework includes an outer shell that contains Ni and has no Ni—Sn layer. Alternatively, for example, a porous metal body, a metal mesh, a perforated metal, an expanded metal, or the like that contains silver, a silver alloy, nickel, a nickel alloy, or the like may be used. However, as with the anode-side current collector, a porous metal body is preferable in terms of lightweight properties and gas permeability. In particular, a porous metal body having a framework of a three-dimensional network structure is more preferable.

In a case where each of the current collectors has sufficient gas permeability, a configuration is possible in which the cathode-side separator 22 and/or the anode-side separator 52 are not provided. In such a case, the cathode-side current collector 21 forms an oxidizing agent flow path, and/or the anode-side current collector 51 forms a fuel flow path. In particular, in a case where a porous metal body having a framework of a three-dimensional network structure is used in the anode-side current collector, the anode-side separator can be preferably omitted because the porous metal body has exceptionally good gas permeability. Similarly, in a case where a porous metal body having a framework of a three-dimensional network structure is used in the cathode-side current collector, the cathode-side separator can be preferably omitted because the porous metal body has exceptionally good gas permeability. As a result, the fuel cell 10 can be lightweight and compact.

The fuel cell can be produced by using a known method except that the cell structure described above is used.

EXAMPLES

The present disclosure will now be described in detail with reference to examples and comparative examples. However, the present disclosure is not limited to the examples described below.

Example 1

(1) Preparation of Porous Metal Body

A polyurethane sheet having a thickness of 1.5 mm was used as the template. 100 g of carbon black, which is amorphous carbon, having a particle diameter of 0.01 to 0.2 μm was dispersed in 0.5 L of a 10% aqueous solution of an acrylic ester-based resin. Thus, an adhesive coating formulation was prepared. Next, the polyurethane template was impregnated with the adhesive coating formulation, squeezed with rolls, and then dried. In this manner, a conductive coating layer was formed on a surface of the polyurethane template.

Subsequently, Ni was deposited on the polyurethane template, which had undergone the conduction process, by using an electroplating method. The amount of deposition was 700 g/m$^2$. The plating liquid used was a nickel sulfamate plating liquid.

Subsequently, a heat treatment was performed at 800° C. in air to remove the polyurethane template, and then a heat treatment was performed at 1000° C. in a reducing atmosphere. In this manner, a porous metal body X, which included a framework having a Ni-containing outer shell, was obtained.

An average pore diameter of the minute openings of the porous metal body X was evaluated by using the method described below. The average pore diameter was 500 am.

Note that the average pore diameter of the porous metal body is measured in the following manner.

A surface of the porous metal body is examined from at least 10 fields of view with a microscope or the like, and the pores (minute openings) are counted. For each of the fields of view, the number of pores per inch (25.4 mm=25400 μm) is determined, and an average value Nc of the numbers of pores associated with the respective fields of view is determined. Then, the average pore diameter is determined according to the following equation.

Average pore diameter(μm)=25400/$Nc$

A porosity of the porous metal body X was evaluated according to 1−(apparent specific gravity of porous metal body/true specific gravity of Ni metal). The porosity was 94%.

Furthermore, a Sn plating process was performed on the porous metal body X by using an electrolytic plating bath containing sulfuric acid and stannous sulfate. Accordingly, the surface of the Ni-containing outer shell was coated with Sn. The amount of deposition of Sn was 80 g/m$^2$. Next, a heat treatment was performed at 1000° C. in a reducing atmosphere to cause Sn to diffuse into the Ni-containing outer shell. Thus, a porous metal body Y, in which the entirety of the outer shell of the framework was formed of a Ni—Sn alloy layer, was obtained.

In the porous metal body Y, a thickness of the Sn plating layer formed on the surface of the Ni-containing outer shell is sufficiently small relative to the pore diameter of the porous metal body X. Accordingly, the porosity of the porous metal body Y is evaluated as being 94%, which is the same as that of the porous metal body X.

(2) Evaluation

As described below, the porous metal body Y was placed in an environment that simulated the anode-side current collector included in the fuel cell 10, and, accordingly, a catalytic activity of the porous metal body Y with respect to a steam reforming reaction was evaluated.

A circular piece having a diameter of 20 mm was cut from the porous metal body Y and was inserted into a cylindrical column also having a diameter of 20 mm. A mixed gas containing water vapor and a hydrocarbon was injected from one end of the column.

The mixed gas contained a gas and water vapor. In the gas, propane ($C_3H_8$) was a major component, and propane, nitrogen ($N_2$), and oxygen ($O_2$) gases were present with the respective molar fractions being 98.7, 0.91, and 0.26 (note that the components that accounted for the remainder of 0.13% were impurities such as ethane and propylene). The water vapor, which was mixed with the gas, was in an amount such that the S/C ratio (a molar ratio of water vapor to carbon present in a hydrocarbon) was 3.0. The mixed gas was supplied at 600° C. at a space velocity SV of 1800 (l/h) to the one end of the column. The mixed gas was supplied for 2 hours.

The components of the gas discharged from the other end of the column were analyzed by gas chromatography-mass spectrometry (GC-MS), and a hydrogen concentration (molar fraction) of the discharged gas was evaluated.

Comparative Example 1

For a porous metal body X that was not subjected to the Sn plating process, the catalytic activity thereof with respect to the steam reforming reaction was evaluated in a manner similar to that for the porous metal body Y.

Figure 7A:
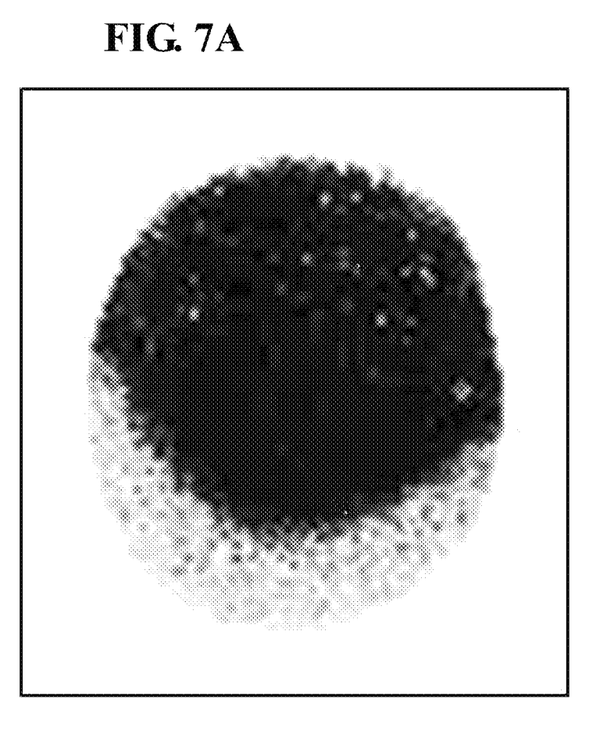
FIG. 7A is a photograph of an appearance of an anode-side current collector of Comparative Example after an evaluation experiment.
Figure 7B:
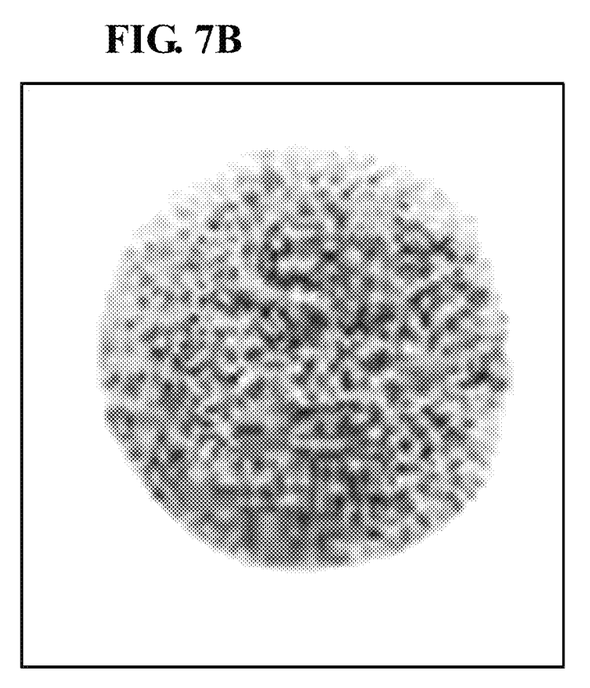
FIG. 7B is a photograph of an appearance of an anode-side current collector of Example after an evaluation experiment.

Table 1 shows the evaluation results of the porous metal body X and the porous metal body Y Furthermore, photographs of the appearances of the porous metal body X and porous metal body Y after the evaluation are shown in FIG. 7A and FIG. 7B, respectively.

As shown in Table 1, regarding the porous metal body X, the discharged gas contained a large amount of hydrogen, which indicated a high catalytic activity with respect to the steam reforming reaction. In associated with this, as shown in FIG. 7A, the porous metal body X after the evaluation was dark, which indicated that carbon (soot) was deposited on the surface of the metal framework.

In contrast, regarding the porous metal body Y, the hydrogen amount of the discharged gas was significantly reduced, which indicated that the steam reforming reaction was noticeably inhibited. As shown in FIG. 7B, little darkening was observed in the porous metal body Y after the evaluation.

Accordingly, in an instance where the porous metal body Y, in which the Ni—Sn layer was formed in at least an outer layer in the outer shell of the framework, is used in an anode current collector in a solid oxide fuel cell, deposition of carbon on a surface of the anode current collector is inhibited even in a case where internal reforming is performed in the anode. Hence, the durability of the fuel cell is improved.

TABLE 1

| Porous metal body | Hydrogen concentration (%) |
| --- | --- |
| X | 66.4 |
| Y | 3.8 |

REFERENCE SIGNS LIST

1: Cell structure
2: Cathode
3: Anode
4: Solid electrolyte layer
5: Electrolyte layer-electrode assembly
10: Fuel cell
21: Cathode-side current collector
22: Cathode-side separator
23: Oxidizing agent flow path
51: Anode-side current collector
52: Anode-side separator
53: Fuel flow path
61: Outer shell
62: Core portion
63: Framework
64: Alloy layer or copper layer
101: Pore portion
102: Fiber portion
103: Opening
104: Cell portion

The invention claimed is:

1. A fuel cell comprising:
a cell structure including a cathode, an anode, and a solid electrolyte layer disposed between the cathode and the anode;
an oxidizing agent flow path formed adjacent to the cathode and away from the solid electrolyte layer, the oxidizing agent flow path being a flow path for supplying a gas that contains an oxidizing agent to the cathode;
an anode-side current collector disposed adjacent to the anode and away from the solid electrolyte layer, the anode-side current collector being in contact with the anode;
an anode-side separator adjacent to the anode-side current collector and away from the solid electrolyte layer; and
a plurality of fuel flow paths formed within the anode-side separator and adjacent to the anode-side current collector, the plurality of fuel flow paths being flow paths for supplying a fuel gas that contains water vapor and a hydrocarbon to the anode, wherein
the anode-side current collector is a porous metal body having a three-dimensional network structure in which a framework is integrally continuous,
the framework includes an outer shell and a core portion, the core portion being hollow, including a conductive material, or being hollow and including a conductive material,
at least an outer layer in the outer shell includes an alloy layer containing a first metal and a second metal with the first metal being Ni and the second metal being Sn,
a first phase and a second phase that have different respective Sn concentrations with respect to Ni coexist in the alloy layer, and the first phase comprises an intermetallic compound phase that contains $Ni_3Sn$ as a major component and the second phase contains Ni as a major component with Sn being dissolved in Ni.

2. The fuel cell according to claim 1, wherein the Sn concentration of the first phase is greater than the Sn concentration of the second phase, and in the alloy layer, Sn is present in an amount of 4 mass % or greater and 15 mass % or less relative to a total amount of Ni and Sn.

3. The fuel cell according to claim 1, wherein the porous metal body has a porosity of 90% or greater and 98% or less.

4. The fuel cell according to claim 1, further comprising:

a cathode-side current collector disposed adjacent to the cathode and away from the solid electrolyte layer, the cathode-side current collector being in contact with the cathode; and a cathode-side separator adjacent to the cathode-side current collector and away from the solid electrolyte layer.

5. The fuel cell according to claim 4, wherein the oxidizing agent flow path comprises a plurality of oxidizing agent flow paths formed within the cathode-side separator and adjacent to the cathode-side current collector.

\* \* \* \* \*